United States Patent [19]

Ishii et al.

[11] Patent Number: 4,520,034

[45] Date of Patent: May 28, 1985

[54] PASTY MASS OF A PROCESSED TUBER AND AN EDIBLE OUTER COVER AND METHOD FOR MAKING THE SAME

[75] Inventors: Mikio Ishii; Kazunobu Iiyama; Tomoyoshi Yazaki, all of Tokyo, Japan

[73] Assignee: Nakamuraya Co., Ltd., Tokyo, Japan

[21] Appl. No.: 552,212

[22] Filed: Nov. 15, 1983

[51] Int. Cl.³ ............................................. A23L 1/216
[52] U.S. Cl. ...................................... 426/96; 426/102; 426/282; 426/290; 426/302; 426/305; 426/550; 426/637
[58] Field of Search ............... 426/96, 102, 282, 289, 426/290, 295, 296, 302, 305, 550, 637, 653, 657, 426/808

[56] References Cited

U.S. PATENT DOCUMENTS

| | | | |
|---|---|---|---|
| 1,806,302 | 5/1931 | Magrill | 426/637 X |
| 2,036,360 | 4/1936 | Romney | 426/637 X |
| 2,130,533 | 9/1938 | Barton | 426/637 X |
| 3,057,732 | 10/1962 | Conrad et al. | 426/637 X |
| 3,551,161 | 12/1970 | Whitestone | 426/550 X |
| 3,761,282 | 9/1973 | Shatila | 426/102 X |

FOREIGN PATENT DOCUMENTS

| | | | |
|---|---|---|---|
| 916991 | 12/1972 | Canada | 426/637 |
| 0071114 | 2/1983 | European Pat. Off. | 426/637 |
| 2440160 | 7/1980 | France | 426/637 |

*Primary Examiner*—Arthur L. Corbin
*Attorney, Agent, or Firm*—Flynn, Thiel, Boutell & Tanis

[57] ABSTRACT

Foods comprising a pasty mass of a processed tuber such as potato or sweet potato with or without a filling therein, and an outer cover made of an edible milk protein-containing material are disclosed. A method for making the covered food is also disclosed in which an edible milk protein-containing material in the form of a solution, suspension or powder is applied onto a pasty mass of a processed tuber, and is dried or heated to form a continuous, tenacious film on the entire surface of the mass.

20 Claims, 2 Drawing Figures

PASTY MASS OF A PROCESSED TUBER AND AN EDIBLE OUTER COVER AND METHOD FOR MAKING THE SAME

BACKGROUND OF THE INVENTION

1. Field of the Invention

This invention relates to the food art and more particularly, to covered foods making use of tubers such as potato, sweet potato and the like. Also, it relates to a method for making foods of the above mentioned type.

2. Description of the Prior Art

As is well known in the art, potato itself is low in calorie and contains a variety of vitamins, thus being very useful as a food. When potato is boiled, mashed and admixed with milk or butter, and is stuffed or filled therein with a seasoned mixture of vegetables or meat, there is obtained an ideal food having well balanced nourishment.

In Europe, there are known potato foods in which seasoned meat or vegetables, or fruit jam is stuffed in a pasty mass or dough of boiled and processed potato, e.g. Grammelknödel, Kartoffelknödel, Zwetschkenknödel and the like. These foods may be eaten after either smothering or frying. In addition, Jewish national foods include a food called Burecas pie (Knish) in which a processed potato product is covered with a dough for noodle or pie, followed by baking or frying.

These foods are usually eaten after steaming or frying. No troubles occur when they are eaten immediately after cooking by the use of a knife and a fork. However, the following drawbacks are observed when the food is eaten a relatively long time after heating.

For instance, when no cover is present, moisture in the foods is liable to evaporate, leading to ready deterioration of the taste thereof. In addition, the foods tend to attach to fingers and lose their shape upon eating directly with the fingers as a ration or snack.

On the other hand, with fried foods with or without coatings, moisture is absorbed in the coatings or outer covers of the foods, or oil used for the frying deteriorates and becomes unpalatable as time passes, and thus these foods become unfavorable with respect to the taste and flavor.

Moreover, the above mentioned types of foods have difficulties in distinctly shaping as desired or impressing a desired pattern thereon and thus are not necessarily high in commercial value.

In order to overcome the above drawbacks, attempts have been made to cover stuffed or filled doughs on the outer surface thereof. The outer cover should meet the following requirements.

(1) A dough has usually a high water content and becomes sticky on the surface thereof. The outer cover should prevent the stickiness.

(2) The outer cover should prevent the moisture in the inside thereof from evaporation.

(3) The outer cover should not harden nor separate from the dough, and the taste thereof does not worsen.

(4) The outer cover should have good flavor, color after baking, and luster.

Various surface treatments of foods are known. For instance, there is a method in which a suitably shaped dough is baked or steamed to form a cover or film on the outer surface of the dough itself. A dough is applied on the surface thereof with raw egg, oils or fats, or a saccharide solution and baked or dried, thereby forming an outer cover on the surface thereof. However, these methods do not satisfy all the requirements mentioned above.

When, for example, mashed potato is shaped in the form of a knöll and baked, as it is, by heating it to such an extent that an outer cover is imparted with a favorable brown color, a larger quantity of water is lost from the inside thereof. The resulting food is unfavorable in taste and is somehow dry and crumbling. In the case where egg is applied, good results are obtained with respect to prevention of stickiness and evaporation of moisture, color after baking, and luster, but the outer cover becomes hardened as time passes and may separate from the content, thus being unpalatable. Furthermore, where a solution of starch in water is applied in small amounts, the resulting food is agreeable to the palate immediately after baking. However, it may absorb moisture in the air and become sticky on the surface thereof when allowed to stand for a while, or may lose moisture from the inside thereof and harden.

SUMMARY OF THE INVENTION

It is an object of the present invention to provide tuber food products which overcome the above described prior-art drawbacks.

It is another object of the present invention to provide tuber food products which have a thin cover film on the outer surface thereof whereby the food products are kept as once shaped and the cover film serves to suppress evaporation of moisture from the inside thereof, thus retaining the flavor and taste of the food products themselves over a relatively long time.

It is a further object of the invention to provide tuber food products having an edible cover film thereon whereby the commercial value thereof is enhanced.

It is a still further object of the invention to provide a method for making tuber food products of the type mentioned above.

We have found that a thin film of edible protein is effective in keeping the shape of the mass covered with the film and preventing the moisture from evaporating from the inside of the mass. For instance, the above mentioned type of film can be readily formed by applying a solution or suspension or powder comprising an edible milk protein-containing material onto a pasty mass or dough of a tuber in a desired form, and drying or heating the applied material until the solution or powder is converted into a film.

According to one embodiment of the present invention, there is provided a covered food product which comprises a pasty mass of a processed tuber in a desired form, and a continuous, tenacious, edible thin film of a milk protein-containing material covering the entirety of the pasty mass therewith. The edible thin film usually has a thickness of about 0.2–1.0 mm.

According to another embodiment of the invention, there is also provided a method for making a covered food product which comprises applying an edible film-forming milk protein-containing material onto a pasty mass of a desired form made of a processed tuber, and drying or heating the applied mass thereby completely covering the pasty mass with a continuous, tenacious film of said edible film-forming material. The application of the edible film-forming material may be effected using either a solution or suspension, or a powder of the material. If protein powder is used, the protein which is applied to the tuber mass may be moistened to a suitable level prior to the heating.

DETAILED DESCRIPTION AND PREFERRED EMBODIMENTS OF THE INVENTION

The term "processed tuber" used herein means potato, sweet potato and the like which are boiled and mashed, and/or admixed with milk and/or butter, and seasonings, if desired. This processed tuber is actually used as a pasty mass or so-called dough which has any desired form.

Although the pasty mass tuber may be used as it is, it is usual in the practice of the invention to stuff or fill the pasty mass with fruit jam or a mixture of seasoned meat or vegetables frizzled in oil, or any other fillings.

The stuffed pasty mass has an edible film cover on the outer surface thereof. The edible film cover should conveniently be a continuous, tenacious film having a thickness of about 0.2 to 1.0 mm, preferably below 0.5 mm. The film serves to keep the shape of the stuffed pasty mass and can protect the taste of the content. The film is so thin that the shape of the content being covered is less influenced by the film, and the quantity of heat required for forming the film is very small, permitting the content to be less changed in shape even after the application of heat. This allows a pattern impressed on the food product to be distinctly observed while keeping its shape, which has been almost impossible in prior-art techniques. Thus, the resulting food product has a high commercial value. The processed foods of tubers such as potato, sweet potato and the like which are covered with a thin film on the entirety thereof are not known at present.

Figure 1:
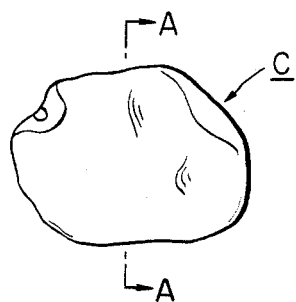
FIG. 1 is a schematic view of a processed potato food product having a shape of a naturally occurring potato.
Figure 2:
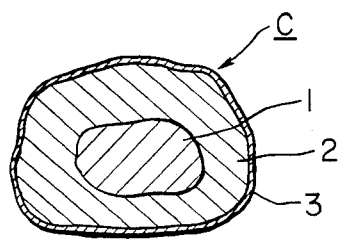
FIG. 2 is a schematic sectional view taken along the line A—A of FIG. 1.

Reference is now made to FIGS. 1 and 2 in which a covered food product using a tuber is shown. In the figures, there is shown a covered food product C which comprises a stuffing or filling 1 such as fruit jam or a seasoned and/or frizzled mixture of vegetables and/or meat. Indicated by 2 is a pasty mass of processed tuber such as potato or sweet potato which may be admixed with cow's milk, butter or the like and by 3 is a film cover made of a milk protein-containing material such as finely powdered cheese, skim milk or the like.

For making the covered food product according to the invention, the milk protein-containing material is applied to a pasty mass of a tuber of any desired form and dried in a stream of air or heated at a temperature of from 150° to 500° C. for a time sufficient for forming a thin film of the milk protein-containing material. The temperature may vary, more or less depending on the type of oven. In practice, the milk protein-containing material is applied as a solution or suspension or a powder. With powder, it is convenient to wet the applied powder by movement of water from the inside of a pasty mass, or by spraying water thereover, thereby wetting the applied powder therewith. By this, the powder is converted, after heating, into a film having good color and luster.

It is known that milk products are sometimes used as a starting material for an icing or a glazing solution. However, in most cases, these products are used in combination with sugar, yolk and the like with a concentration of milk proteins being below 1%. In the case where the content of milk protein is so small, the resulting film has such properties of being hardened over a long term and being separate from the content or pasty mass. In order to avoid the above drawbacks, the milk protein-containing material should have a content not smaller than 3 wt%.

As indicated before, the thickness of the film is generally in the range of 0.2–1.0 mm, preferably below 0.5 mm. In order to form a film on the pasty mass of a desired form, the pasty mass, having thereon a coating of a powder or suspension or solution of a milk protein-containing material, is heated or baked in an oven. The film formed by drying at low temperatures has no color from baking or scorching, nor flavor resulting from the baking or heating of the film, but can keep the shape of pasty mass and prevent moisture in the inside of the mass from evaporating. In this case, it is sufficient to bake the coated mass, such as in an oven, immediately before eating, thereby obtaining a food with favorable color and taste.

The present invention is particularly described by way of example.

EXAMPLE 1

| Formulation | |
| --- | --- |
| Dough | |
| Potato | 1 kg |
| Butter | 75 g |
| Cow's milk | 200 ml |
| Seasonings (salt, pepper) | Small quantities |
| Filling | |
| Beef | 200 g |
| Onion | 200 g |
| Sweet pepper | 100 g |
| Seasonings (rice spirit, soy sauce) | Suitable amounts |
| Salad oil | Small quantity |
| Film-forming material | |
| Mixture of finely powdered cheese (about 100 microns) and skim milk in a mixing ratio of 8:2 | 30 g |

Potatoes were pared and cut into pieces of a suitable size and boiled until they were softened. The softened potatoes were mashed and admixed with butter, followed by well mixing. Subsequently, hot milk was added to the mixture portion by portion while heating, followed by mixing under heating conditions and controlling the water content as desired. The moisture content in the dough i.e., the pasty mass was conveniently at a level of 70% or less. Salt and pepper were added for seasoning.

On the other hand, beef was minced and frizzled in oil quickly. Finely chopped vegetables which had been separately frizzled in oil were added to the frizzled beef, followed by seasoning with soy sauce, rice spirit and sugar.

The dough was divided into pieces each having a weight of 60 g and filled with about 15 g of the seasoned mixture, followed by rolling on the film-forming powder to cover the pieces therewith. By this, about 1–2 g of the powder was attached to each piece. The pieces were subsequently shaped in the form of a potato. The shaped potatoes were placed on a plate and uniformly sprayed with water, followed by placing in an oven of 220° C. and baking for about 5–10 minutes until the outer surface was slightly scorched. When the potato products were uneven in degree of baking, they were turned so as to be baked uniformly.

The resulting food products had a favorable taste of cheese with good color and luster. These products had an appearance very similar to a baked potato whose skin was removed. This product contained the seasoned mixture of meat and vegetables therein and was considered to be a very excellent food from the standpoint of nourishment. Because of the presence of the cover, evaporation of the moisture from the inside of the product was suppressed to an extent. Accordingly, the flavor and taste of potato itself were retained over a long term. The potato product had an additional advantage that it could be eaten with the fingers and was suitable as a snack or ration.

EXAMPLE 2

| Formulation | |
| --- | --- |
| Dough | |
| Potato | 1 kg |
| Margarine | 80 g |
| Skim milk | 30 g |
| Seasonings (salt, pepper) | Small quantities |
| Filling | |
| Bacon | 200 g |
| Onion | 200 g |
| Seasonings (salt, pepper) | Small quantities |
| Salad oil | Small quantities |
| Film-forming material | |
| Mixture of finely powdered cheese (about 100 microns) and skim milk at 7:3 | 30 g |

The potatoes were cooked in the same manner as in Example 1 and strained. The thus treated potatoes were admixed with margarine when kept hot and mixed well. To the mixture was further added portion by portion the skim milk dissolved in a small amount of water, which was subsequently mixed well. If water was contained in a larger amount as required, the mixture was heated to control the water content at a suitable level. Finally, salt and pepper were added for seasoning.

The seasoned mixture was made as follows. Bacon was frizzled in oil, to which was added finely chopped onion separately frizzled by the use of oil. Salt and pepper were added for seasoning. The seasoned mixture was filled in pieces of the dough in the same manner as in Example 1, followed by rolling on the film-forming powder, shaping, spraying water on the surface of each piece, and heating in an oven of 220° C. for about 5–10 minutes. When the amount of the skim milk was increased, the film-forming powder was baked more quickly with an increasing degree of luster.

EXAMPLE 3

| Formulation | |
| --- | --- |
| Dough | |
| Sweet Potato | 1 kg |
| Butter | 90 g |
| Yolk | 50 g |
| Salt | 2 g |
| Rum | 2 g |
| Filling | |
| Preserved apple | 120 g |
| Raisins dipped in liquor | 80 g |
| Film-forming material | |
| Mixture of finely powdered cheese (about 100 microns) and skim milk at 2:8 | 50 g |

Sweet potatoes were washed with water and heated in an oven of a moderate fire for a time of 30 minutes to 1 hour so that they were baked to the center thereof while sometimes turning the sweet potatoes. Each sweet potato was longitudinally cut into halves and the content of each half was removed by a spoon, followed by straining under hot conditions. To the strained potato were added butter, salt and yolk, followed by kneading under heating conditions to such an extent that the mixture did not stick to a spatula. Finally, rum was added to the mixture. The filling from which the stock or liquor was removed was added to the mixture. 15 g of the filling was filled in 50 g of the dough, followed by shaping in the form of an oval and rolling on the finely powdered film-forming material thereby depositing the material over the entire surface of the oval. Thereafter, water was uniformly sprayed over each oval, followed by baking in an oven at a temperature of about 200° C. for a time of 5–10 minutes until the oval was baked in a uniform color. The resulting food product was a very favorable sweet in which the fruits were covered with the dough making use of a taste of the sweet potato itself without addition of any other sweets.

What is claimed is:

1. A food product which comprises a pasty mass of a processed tuber of a desired form, and a continuous, tenacious, thin edible film consisting essentially of a milk protein-containing material covering the entirety of the pasty mass.

2. The food product according to claim 1, wherein said edible thin film has a thickness of about 0.2–1.0 mm.

3. The food product according to claim 1, wherein said pasty mass has a filling therein.

4. The food product according to claim 1, wherein the tuber comprises potato.

5. The food product according to claim 1, wherein the material consists essentially of a mixture of milk and cheese.

6. A method for making a food product which comprises the steps of applying an edible film-forming material consisting essentially of milk protein-containing material onto a pasty mass of a desired form made of a processed tuber, and drying or heating the applied material to thereby completely cover the pasty mass with a continuous, tenacious film of said edible film-forming material.

7. The method according to claim 6, wherein said pasty mass has a filling therein.

8. The method according to claim 6, wherein said edible film-forming material is applied in the form of a suspension, solution or powder.

9. The method according to claim 8, wherein said suspension or solution has a concentration of said edible film-forming material of not smaller than 3 wt%.

10. The method according to claim 8, wherein said powder is sprayed with water after it is applied to the pasty mass.

11. The method according to claim 8, wherein said powder is moistened by movement of water from the pasty mass after the powder has been applied thereto.

12. The method according to claim 6, wherein said applied material is heated to a temperature of from 150° to 500° C. for a time sufficient for forming the film.

13. A method for making a food product which comprises the steps of processing a tuber to form a moist pasty mass, forming a selected quantity of said pasty mass into a shaped mass, applying an edible film-forming material consisting essentially of a milk protein-containing material onto the outer surface of the shaped mass so as to substantially cover the entirety of the shaped mass, and then heating the shaped mass to cause the protein-containing material to form a thin edible film covering the entirety of the shaped mass.

14. The process according to claim 13, wherein the film has a thickness of about 0.2 mm to about 1.0 mm.

15. The process according to claim 14, wherein the tuber comprises potato.

16. The process according to claim 13, wherein the film-forming material is first applied to the shaped mass as a dry powder and is then sprayed with water prior to heating.

17. The process according to claim 13, wherein the film-forming material is applied to the shaped mass in the form of a suspension or solution.

18. The process according to claim 13, including the step of inserting a filling into the shaped mass prior to application of the film-forming material thereto.

19. The process according to claim 13, wherein the film-forming material consists essentially of a mixture of milk and cheese.

20. An edible food product prepared according to the process of claim 13.

* * * * *